(12) United States Patent
Corrigan et al.

(10) Patent No.: US 6,209,347 B1
(45) Date of Patent: Apr. 3, 2001

(54) ADSORBENT UNIT WITH REFRIGERANT TRACER COMPARTMENT

(75) Inventors: Daniel L. Corrigan, Kingston (CA); Kevin J. Goulet, Milford; Donald L. Konieczy, Northville, both of MI (US); Peter R. Millen, Perry, NY (US); Michael A. Olesnavich, Bloomfield Hills, MI (US); Stephen F. Sullivan, Boardman, OH (US)

(73) Assignees: Multisorb Technologies, Inc., Buffalo, NY (US); Visteon Global Technologies, Inc., Dearborn, MI (US); Halla Climate Control Canada, Inc., Belleville (CA)

( * ) Notice: Subject to any disclaimer, the term of this patent is extended or adjusted under 35 U.S.C. 154(b) by 0 days.

(21) Appl. No.: 09/451,305

(22) Filed: Nov. 29, 1999

(51) Int. Cl.[7] .................................................. F25B 43/04
(52) U.S. Cl. ........................................... 62/475; 62/503
(58) Field of Search ............................... 62/503, 475, 125

(56) References Cited

U.S. PATENT DOCUMENTS

| | | | |
|---|---|---|---|
| 4,405,347 | * 9/1983 | Cullen et al. | 55/387 |
| 4,911,739 | * 3/1990 | Cullen et al. | 55/387 |
| 5,036,972 | * 8/1991 | Cullen et al. | 206/204 |
| 5,650,563 | 7/1997 | Cooper et al. | 73/40.7 |
| 5,651,266 | * 7/1997 | Hutchison et al. | 62/474 |

* cited by examiner

Primary Examiner—William Doerrler
Assistant Examiner—Melvin Jones
(74) Attorney, Agent, or Firm—Joseph P. Gastel

(57) ABSTRACT

An adsorbent unit for a refrigerant accumulator having a housing with a bottom wall and a side wall and a U-shaped pipe with a return bend adjacent the bottom wall and with first and second pipe portions extending from the return bend along the side wall, and a filter body extending outwardly from the return bend, the adsorbent unit including a porous adsorbent container, adsorbent in the container, first and second end portions on the container, a first tab extending outwardly from the first end portion of the container, an elongated slot in the first tab mounting it on the first and second pipe portions, a second tab extending outwardly from the second end portion of the container, an aperture on the second tab mounting it on the filter body, and a separate compartment on the adsorbent unit containing a refrigerant tracer dye.

21 Claims, 11 Drawing Sheets

ADSORBENT UNIT WITH REFRIGERANT TRACER COMPARTMENT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to an improved adsorbent unit which contains a separate compartment containing refrigerant tracer for use in a refrigerant accumulator of an automotive air conditioning system.

In the past, a refrigerant tracer was placed in direct contact with the desiccant in an adsorbent unit of an automotive air conditioning system to detect refrigerant leaks in the system by displaying the color of the tracer at the point of leakage. However, when the desiccant of the adsorbent unit was tested for water content, the tracer, which was in direct contact with the desiccant, caused erroneously high water content readings to be obtained. It is with overcoming the foregoing deficiency of prior adsorbent units that the present invention is concerned.

BRIEF SUMMARY OF THE INVENTION

It is the object of the present invention to integrate a refrigerant tracer into a separate compartment on the adsorbent unit which is used in an air conditioning system without producing erroneously high water content readings of a tested desiccant. Other objects and attendant advantages of the present invention will readily be perceived hereafter.

The present invention relates to an adsorbent unit for an air conditioning system comprising a porous container, adsorbent in said container, a refrigerant tracer, and a separate compartment on said adsorbent unit containing said refrigerant tracer.

The present invention also relates to an adsorbent unit comprising a porous adsorbent container having a width, adsorbent in said container, a tab extending outwardly from said container, an elongated slot in said tab extending in the direction of said width of said container and said tab having a length which approximates the widest portion of said container, and a compartment on said tab containing a refrigerant tracer.

The present invention also relates to an adsorbent unit for mounting relative to a U-bend pipe of a refrigerant accumulator having spaced pipes and a return bend comprising a porous container, adsorbent in said container, first and second end portions on said container, first mounting means on said first end portion for placement about said spaced pipes with said container located between said first mounting means and said return bend, second mounting means at said second end of said container for mounting relative to said return bend, and a compartment on said adsorbent unit containing a refrigerant tracer.

The present invention also relates to a refrigerant accumulator having a housing with a bottom wall and a side wall and a U-shaped pipe with a return bend adjacent said bottom wall and with first and second pipe portions extending from said return bend along said side wall, and a filter body extending outwardly from said return bend, the improvement of an adsorbent unit comprising a porous adsorbent container, adsorbent in said container, first and second end portions on said container, first means on said first end portion for mounting said adsorbent container relative to said first and second pipe portions, second means on said second end portion for mounting said adsorbent container relative to said return bend, and a compartment on said adsorbent unit containing a refrigerant tracer.

The various aspects of the present invention will be more fully understood when the following portions of the specification are read in conjunction with the accompanying drawings wherein:

DETAILED DESCRIPTION OF THE INVENTION

Figure 1:
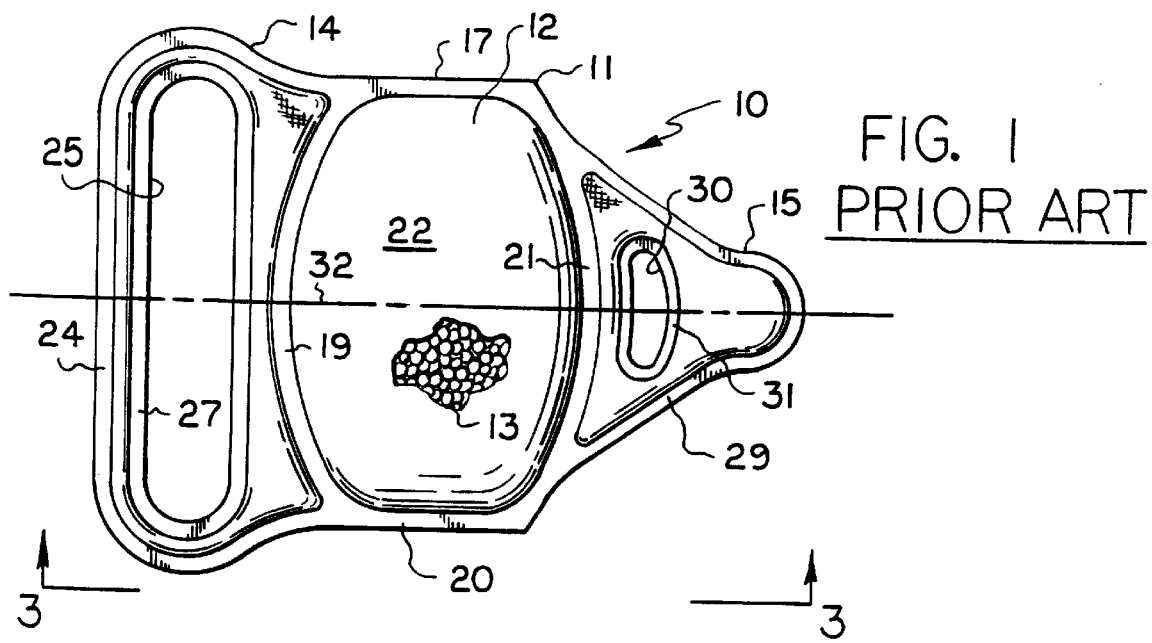
FIG. 1 is a partially broken away plan view of one embodiment of a general type of adsorbent unit relative to which the refrigerant tracer construction of the present invention can be incorporated.

One type of adsorbent unit 10 in which the refrigerant tracer construction of present invention can be incorporated includes a casing 11 formed of porous material, in this instance, heat-fusible felted polyester, but it may be fabricated of any other suitable material. Casing 11 is formed from two sides of felted polyester which are bonded to each other by fused seams, and it comprises a container 12 containing adsorbent 13 with the container having apertured tabs 14 and 15 extending outwardly from the opposite end portions thereof, as described in detail hereafter. The preferred adsorbent is molecular sieve but any other suitable adsorbent may be used.

Container 12 is defined by fused seams 17, 19, 20 and 21. Container 12 has a pronounced convex surface 22 and a substantially planar surface 23. However, surface 23 may be convex. Tab 14 includes an outer fused seam 24 which merges into seams 17 and 20, and tab 14 is defined by fused seams 24 and 19. Tab 14 includes an elongated slot 25 which is defined by fused seam 27. Tab 15 is outlined by fused seam 29 and a portion of fused seam 21. An aperture 30 in tab 15 is outlined by fused seam 31.

The adsorbent unit 10 is symmetrical about central axis 32, but it need not be. Additionally, elongated slot 25 approximates the width of container 12 across fused seams 17 and 20, and the length of slot 25 extends in substantially the same direction as the width across seams 17 and 20. The foregoing approximate relationship means that the slot 25 has a length which is generally about the width of the container 12 so that the return bend end of a U-bend pipe can be inserted through it, as will become apparent hereafter. Thus, the length of slot 25 can be slightly smaller or slightly larger than the width of the adsorbent container 12.

The adsorbent unit 10 is intended to be mounted in a prior art accumulator-type of receiver 33 (FIGS. 4 and 5) which includes an upper cylindrical housing portion 34 having a side wall 36 and a lower cylindrical housing portion 35 having a side wall 38 and having a flange 37 which receives the lower edge portion of upper portion 34 with an interference fit, and a joint is thereafter hermetically welded at 39. Insofar as pertinent here, the accumulator 33 includes a U-bend pipe 40 having a refrigerant inlet end 41 which receives a mix of gaseous and liquid refrigerant and conducts it through pipe 42 having an open end 43 proximate concave surface 44 such that the refrigerant impinges thereon and enters the accumulator. The upper end 45 of U-shape pipe 40 is open and it receives gaseous refrigerant which passes through pipe 47, return bend 49, pipe 50, and pipe 51 to outlet 52 which leads to the compressor, as is well known in the art. As noted above, the gaseous refrigerant passes through U-shaped tube 40 because it rises to the top while the liquid refrigerant from the evaporator drops to the bottom of the accumulator. A lubricant inlet (not shown) is located at the underside of the return bend 49. A filter housing 53 having a filter 54 thereon is in communication with the lubricant inlet in the return bend 49 such that lubricant which accumulates in depression 55 of bottom wall 56 is induced into the return bend and conveyed with the gaseous refrigerant to the compressor, as is well known in the art. As can be seen from FIG. 5, the U-bend 40 includes two spaced pipes 47 and 50 which are connected by U-bend 49. In the present instance, pipe 50 is substantially vertical and pipe 47 is inclined. The U-bend 40 is sometimes referred to as a J-bend.

In FIGS. 5–9, adsorbent unit 10 is shown in its installed position. In this respect, tab 14 is looped about pipes 47 and 50 which pass through elongated slot 25 therein. The convex side 22 of adsorbent container 12 bears against pipes 47 and 50, and the central portion of convex side 22 protrudes into the space between pipes 47 and 50. Tab 15 is mounted on filter housing 53 which protrudes through aperture 30.

Figure 14:
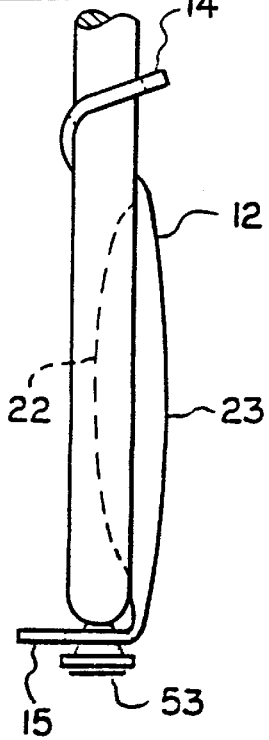
FIG. 14 is a schematic view showing the apertured tab mounted on the filter housing.
Figure 13:
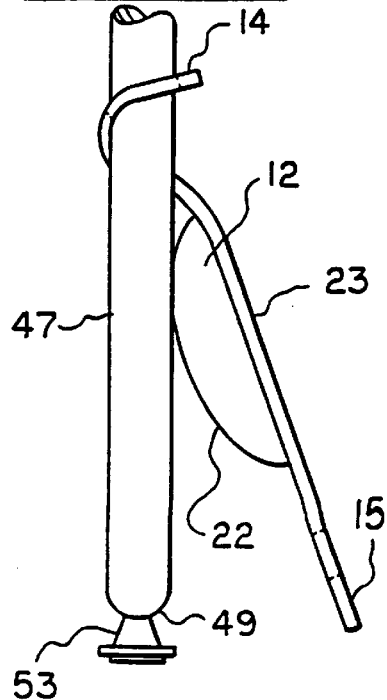
FIG. 13 is a schematic view showing the adsorbent container threaded through the space between the spaced pipes of the U-bend pipe.

The manner in which adsorbent unit 10 is installed is set forth in FIGS. 10–14. The first step is to thread the return bend 49 and spaced pipes 47 and 50 through elongated slot 25 of tab 14 as depicted in the progression shown in FIGS. 10–12. Thereafter, as shown in FIG. 13, the container 12 is passed through the space between pipes 47 and 50 below tab 14 until container side 22 faces pipes 47 and 50. Thereafter, as shown in FIG. 14, the filter housing 53 is threaded through aperture 30 of tab 15 to complete the mounting of adsorbent unit 10 on the U-bend pipe 40.

It can thus be seen that the tab 14 secures one end of the adsorbent container 12 relative to the spaced pipes 47 and 50, and tab 15 secures the other end of adsorbent container 12 relative to return bend 49 and holds the container 12 against moving upwardly in the accumulator. Additionally, it is to be observed that there are no external ties required to hold the adsorbent container 12 in position, and, further, the installation is extremely simple by following the above-described steps enumerated relative to FIGS. 10–14 wherein the return bend 49 and the spaced pipes 47 and 50 are threaded through elongated aperture 25 of tab 14, and then the adsorbent container 12 is passed through the space between pipes 47 and 50 below tab 14, and thereafter tab 15 is mounted on filter housing 53. In the final installed position, the convex side 22 of adsorbent container 12 lies in contiguous relationship to return bend 49 and spaced pipes 47 and 50. If desired, the adsorbent unit 10 may be installed with adsorbent container side 23 bearing against spaced pipes 47 and 50. However, this does not have the advantage shown in FIG. 7 wherein the convex configuration of side 22 helps to maintain the adsorbent unit in position against sidewise movement relative to pipes 47 and 50. Also, the adsorbent unit may be mounted by slipping the U-bend through the elongated slot 25 and thereafter mounting tab 14 on the filter housing without passing the adsorbent container 12 through the space between pipes 47 and 50 as described above.

While not shown in the drawing, two adsorbent units 10 of FIGS. 1–3 can also be mounted on the U-bend pipe 40 in the following manner. Two adsorbent units 10 are held with their sides 22 facing each other and with their tabs 14 superimposed so that slots 25 are aligned. Then the U-bend pipe 40 is threaded through both slots 25 until both tabs 14 lie along pipes 47 and 50 with both containers 12 located to one side of pipes 47 and 50. Thereafter, one container 12 is threaded through the space between the two pipes 47 and 50 so that now the two containers are on opposite sides of pipes 47 and 50 with their sides 22 facing each other. Then the tab 15 of each adsorbent unit 10 is mounted on the filter housing 53 so that they overlap each other.

Figure 2:
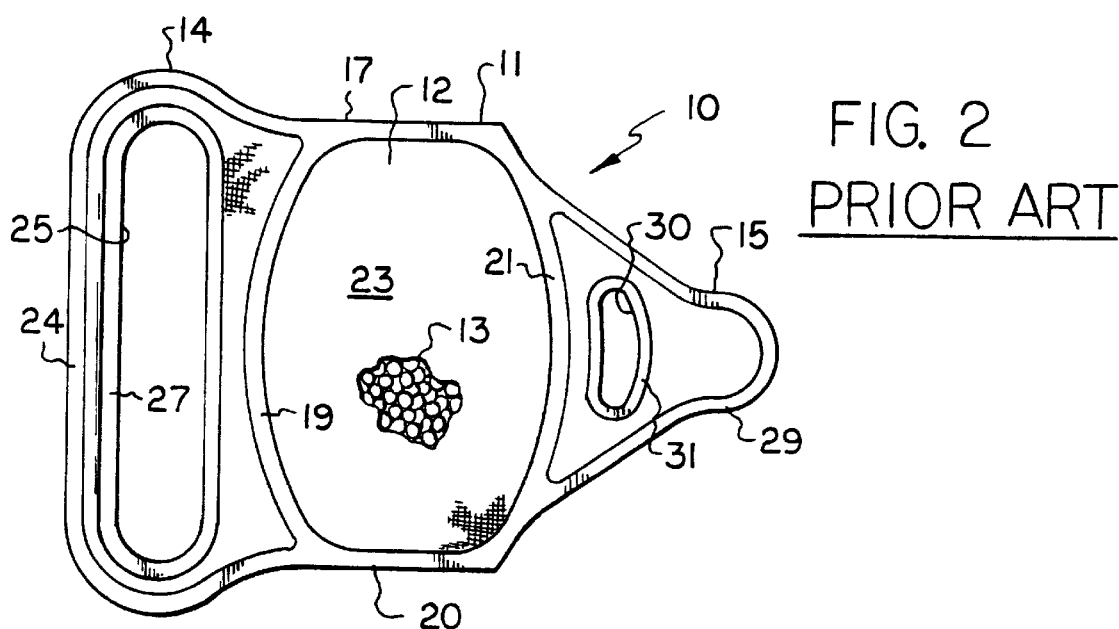
FIG. 2 is a partially broken away plan view of the adsorbent unit of FIG. 1 showing the opposite side thereof.
Figure 3:
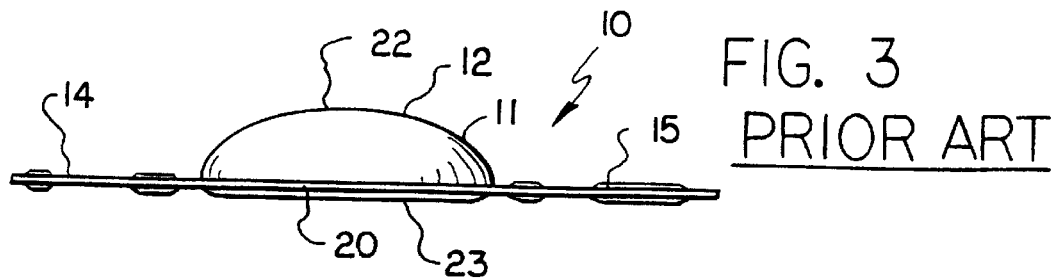
FIG. 3 is a side elevational view taken substantially in the direction of arrows 3—3 of FIG. 1.
Figure 15:
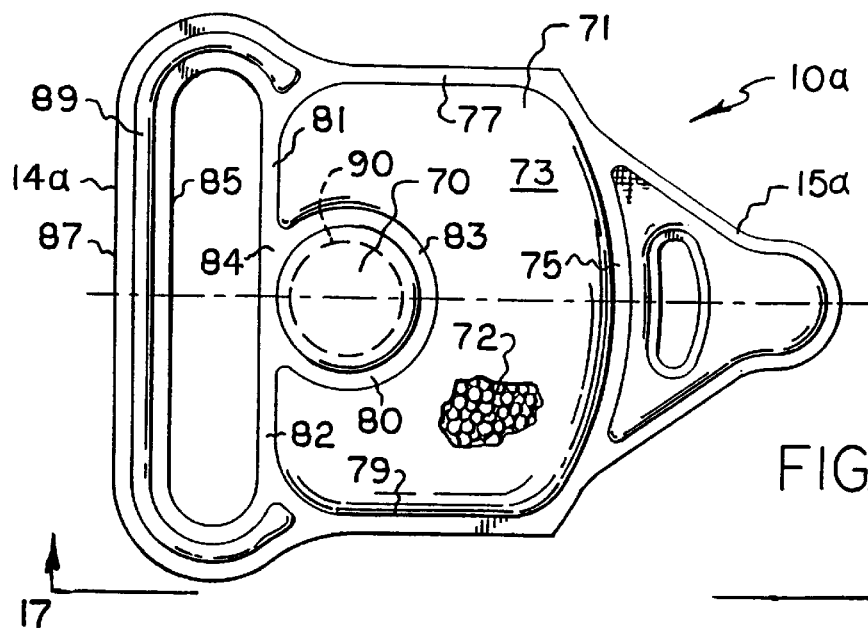
FIG. 15 is a partially broken away plan view of one embodiment of the present invention showing an adsorbent unit of the general type described relative to FIGS. 1–14 and showing the pronounced convex surface portion thereof with a separate compartment on the adsorbent container which contains a refrigerant tracer.
Figure 16:
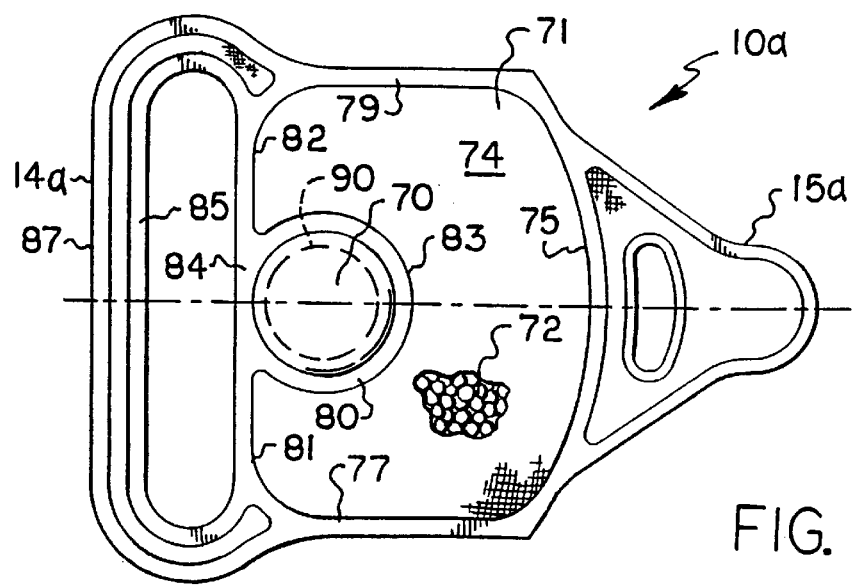
FIG. 16 is a partially broken away plan view of the adsorbent unit of FIG. 15 showing the less convex surface of the adsorbent container.
Figure 17:
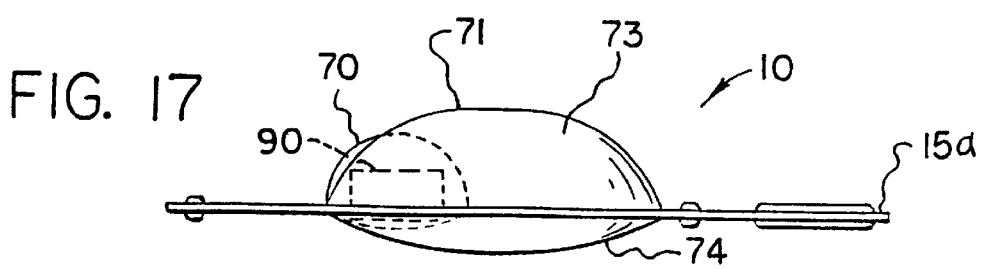
FIG. 17 is a side elevational view taken substantially in the direction of arrows 171—17 of FIG. 15.
Figure 18:
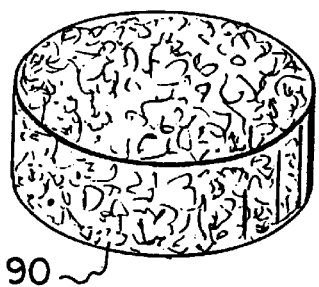
FIG. 18 is a perspective view of a prior art fibrous wafer containing refrigerant tracer.

In accordance with the present invention, in FIGS. 15–17 an adsorbent unit 10a is shown which is a modification of to the adsorbent unit 10 of FIGS. 1–3 in that it is of slightly different form, and has a separate refrigerant tracer compartment 70 which is immediately adjacent to the container 71 which contains molecular sieve adsorbent 72, and the tracer compartment contains a tracer wafer 90 isolated from the adsorbent 72. The adsorbent unit 10a is formed of porous material, in this instance, heat-fusible polyester but it may be fabricated of any other suitable porous material. The adsorbent unit 10a is formed from two sides of felted polyester, which are bonded to each other by fused seams, as described above relative to FIGS. 1–3. The container 71 has a pronounced convex side 73 and a less pronounced convex side 74. However, side 74 may be substantially planar as shown above relative to FIGS. 1–3. Compartment 70 also has at least one convex side. The adsorbent container 71 is bounded by fused seams 75, 77, 79 and 80 which also forms a seam of tracer compartment 70. Seam 80 includes straight portions 81 and 82 and circular portion 83. The refrigerant tracer compartment 70 includes fused seam 83 and fused seam 84 which joins seams 81 and 82. A tab 15a extends outwardly from seam 75. Tab 15a may be identical in all respects to tab 15 described above relative to FIGS. 1–3, and it functions in the same manner. Accordingly, it is deemed that a further description of tab 15a is unnecessary. A tab 14a extends outwardly from the opposite side of the adsorbent unit from tab 15a. It is substantially identical to tab 14 of FIGS. 1–3, and it includes fused seams 85 and 87 on opposite sides of unfused portion 89. The ends of fused seam 87 merge into fused seams 77 and 79, and the ends of fused seam 85 merge into seams 81 and 82. The tab 14a functions in the same manner as described above relative to FIGS. 1–14. The tab 14a may be attached to container 71 in the same manner shown in FIGS. 1–3 with a fabric portion between the container 71 and tab 14a, as shown in FIGS. 1–3, rather than as shown in FIGS. 15–17.

As noted above, a refrigerant tracer wafer 90 (FIGS. 15–18) is housed in compartment 70 separate from the desiccant 72 in container 71. The tracer wafer 70 is fabricated from felted polyester fibers, and it contains a yellow dye therein which permeates the refrigerant in the air conditioning system after the refrigerant passes through it, and if there is a leak in the system, the dye appears on the outside of the system at the area of the leak. The tracer wafer 90 is a prior art product TP-3869 of Tracer Products, a division of Spectronics Corp. In the past this wafer was placed directly into the adsorbent compartment of an adsorbent unit. This was objectionable in that it interfered with the testing of water content of the molecular sieve. In this respect, the tracer dye was in direct contact with the molecular sieve and it bled into the molecular sieve, and when the loss of ignition (LOI) test was performed to determine the water content of the molecular sieve in the adsorbent unit, the test results erroneously indicated a higher water content than actually existed in the molecular sieve. However, when the refrigerant tracer is in a separate completely sealed compartment, such as 70, there is no direct contact between the refrigerant tracer 90 and the adsorbent 72, and thus the tracer dye does not cause the adsorbent 72 to indicate a higher than actual water content when it is tested.

Figure 19:
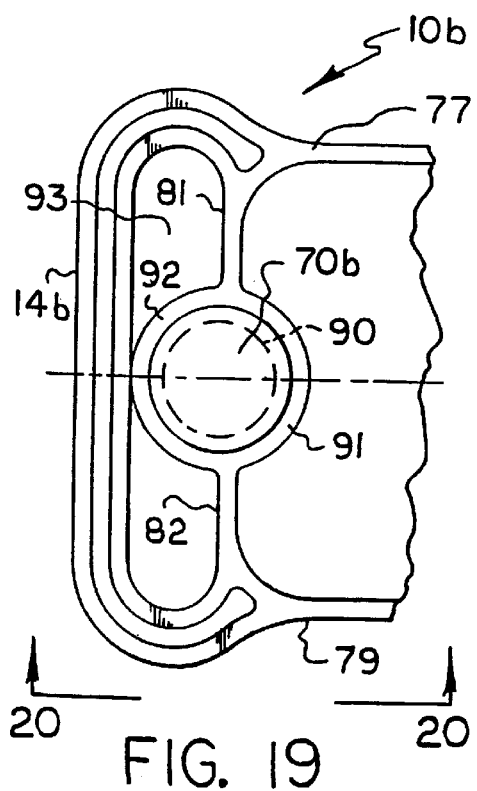
FIG. 19 is a fragmentary plan view of another embodiment of an adsorbent unit of the type shown in FIG. 15 and containing a refrigerant tracer compartment which is located differently from that shown in FIGS. 15–17.
Figure 20:
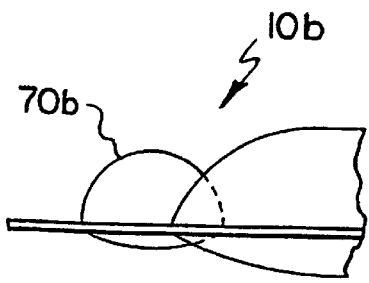
FIG. 20 is a fragmentary side elevational view taken substantially in the direction of arrows 20—20 of FIG. 19.

In FIGS. 19 and 20 another embodiment of an adsorbent unit 10b is shown which is different from adsorbent unit 10a. The adsorbent unit 10b is identical in all respects to adsorbent unit 10a except that the refrigerant tracer compartment 70b is still immediately adjacent to the adsorbent container but is placed differently than compartment 70 of adsorbent unit 10a so that there is less of a common seam therebetween. As can be seen from FIG. 19, a seam 91 joins seams 81 and 82 and seam 91 is shorter than seam 83 of adsorbent unit 10a. Furthermore, compartment 70b is defined by fused seam 91 and fused seam 92 which form a circle. The tracer compartment 70b extends into the space 93 between the adsorbent container and tab 14b which is identical to tab 14a. As noted above, except for the placement of tracer compartment 70b, the adsorbent unit 10b is identical in all other respects to adsorbent unit 10a of FIGS. 15–17. The different placements of compartments 70 and 70b in FIGS. 15 and 19, respectively, provides a latitude in the required amount of adsorbent which can be placed in the respective containers.

Figure 21:
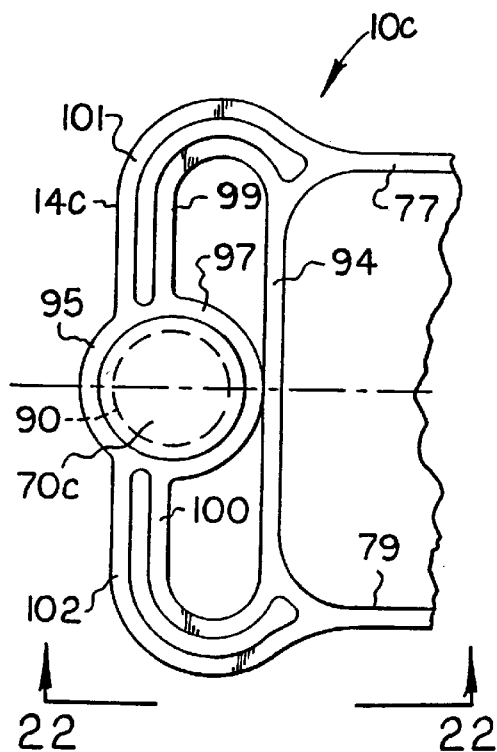
FIG. 21 is a fragmentary plan view of another embodiment of an adsorbent unit of the type shown in FIGS. 15–17 but having the refrigerant tracer compartment on the tab which attaches the adsorbent unit to a U-bend.
Figure 22:
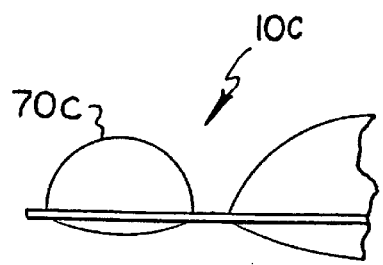
FIG. 22 is a fragmentary side elevational view taken substantially in the direction of arrows 22—22 of FIG. 21.

In FIGS. 21 and 22 another embodiment of an adsorbent unit 10c is shown which is identical in all respects to adsorbent unit 10a of FIGS. 15–17 except that there is a continuous seam 94 at the end of the adsorbent container, and the tracer compartment 70c is formed on the tab 14c. In this respect the tracer compartment 70c is defined by fused seams 95 and 97. Fused seam 97 joins fused seams 99 and 100, and fused seam 95 joins fused seams 101 and 102. In the embodiment of FIGS. 21 and 22, the refrigerant tracer compartment with tracer therein is completely separated from the adsorbent container.

Figure 23:
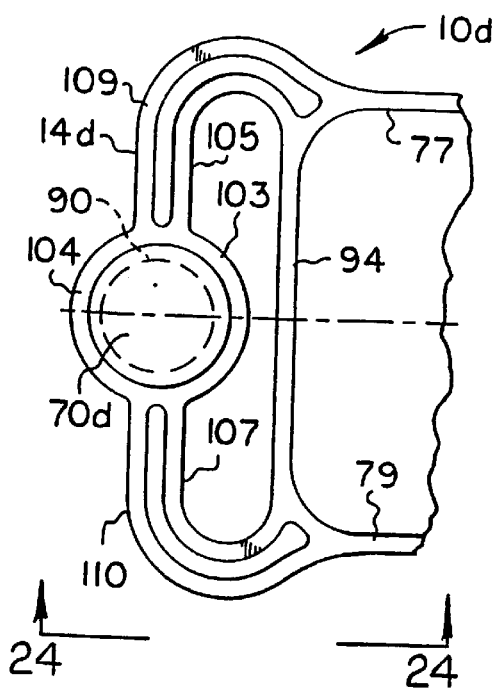
FIG. 23 is a fragmentary plan view of another embodiment of an adsorbent unit of the type shown in FIG. 15–17 and having the refrigerant tracer compartment on the tab portion but oriented differently than in FIGS. 21 and 22.
Figure 24:
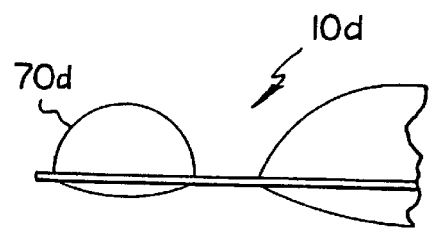
FIG. 24 is a fragmentary side elevational view taken substantially in the direction of arrows 24—24 of FIG. 23.

In FIGS. 23 and 24 another embodiment of an adsorbent unit 10d is shown which is identical in all respects to adsorbent unit 10c of FIGS. 21 and 22 except that the refrigerant tracer compartment 70d is more centered on tab 14d. The tracer compartment 70d is defined by fused seams 103 and 104. Seam 103 joins seams 105 and 107 and seam 104 joins seams 109 and 110.

Figure 25:
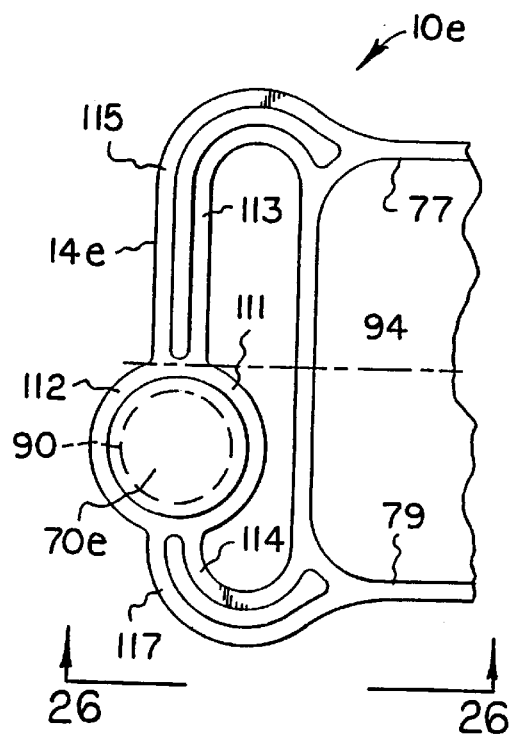
FIG. 25 is a fragmentary plan view of another embodiment of an adsorbent unit of the type shown in FIGS. 15–17 and having the refrigerant tracer compartment on the tab but oriented differently from the orientations shown in FIGS. 21–24.
Figure 26:
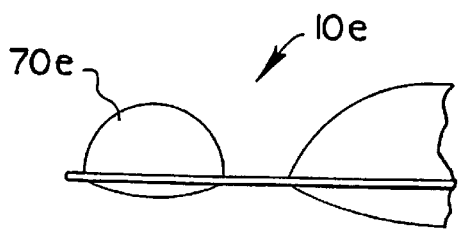
FIG. 26 is a fragmentary side elevational view taken substantially in the direction of arrows 26—26 of FIG. 25.

In FIGS. 25 and 26 another embodiment of an adsorbent unit 10e is shown which may be identical in all respects to the adsorbent unit of FIGS. 23 and 24 except that the tracer compartment 70e is located offset on tab 14e which is analogous to tab 14d. Tracer compartment 70e is defined by fused seams 111 and 112 which form a circle. Fused seam 111 joins seams 113 and 114, and fused seam 112 joins seams 115 and 117. The various placements of the adsorbent compartments in the tabs of the embodiments of FIGS. 21–26 provides a latitude for mounting the adsorbent units in various installations.

Figure 27:
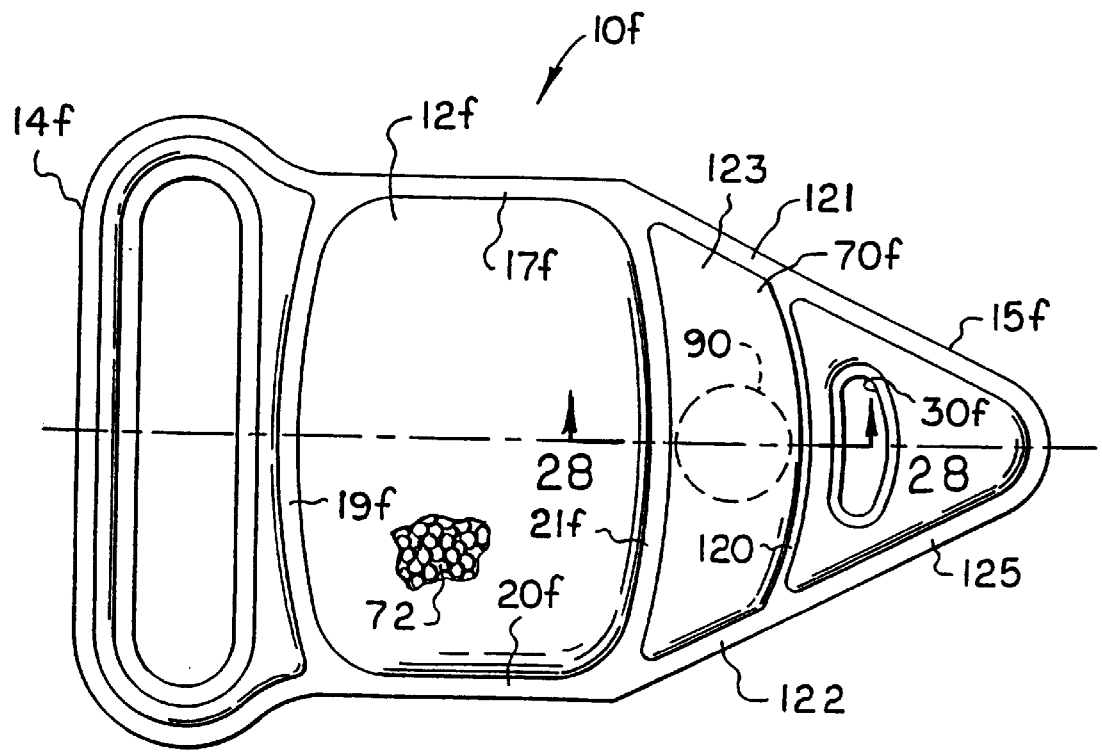
FIG. 27 is a plan view of another embodiment of an adsorbent unit of a type similar to that shown in FIG. 1 but showing the refrigerant tracer compartment as part of the tab which attaches the adsorbent unit to the filter housing shown in FIGS. 4 and 5.
Figure 28:
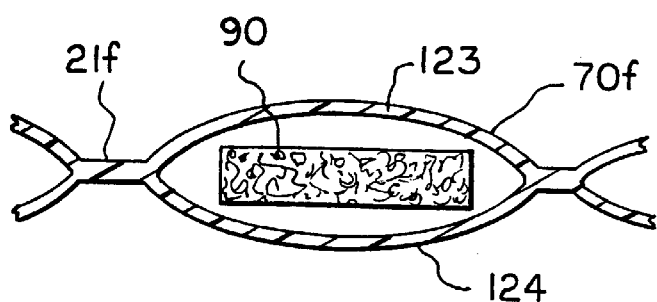
FIG. 28 is a fragmentary cross-sectional view taken substantially along line 28—28 of FIG. 27.

In FIGS. 27 and 28 another embodiment of an adsorbent unit 10f is shown which differs from the preceding embodiments and also differs from the embodiment of FIGS. 1–3 in certain respects. In the embodiment of FIGS. 27 and 28 the adsorbent container 12f may be substantially identical to container 12 of FIGS. 1–3 except that fused seams 17f, 19f, 20f and 21f are of slightly different shape and dimensions than the corresponding seams of FIG. 1. The side elevational configuration of container 10f may be as shown in FIG. 3 or as shown in FIG. 17. The tab 14f may be identical in all respects to tab 14 of FIGS. 1–3 except that it may have slightly different dimensions. The embodiment of FIGS. 27–28 differs from all of the preceding embodiments in that the tracer compartment 70f is formed between fused seam 21f, fused seam 120 and fused seams 121 and 122 which join seams 21f and 120. The tracer compartment 70f is further defined by porous polyester sides 123 and 124. A tab 15f, which is analogous to tab 15 of FIGS. 1–3 and tab 15a of FIGS. 15–17 is defined by fused seam 120 and fused seam 125, the ends of which merge into fused seams 121, 122 and 120. An aperture 30f is located in tab 15f, and it is analogous to aperture 30 of FIGS. 1–3 and it functions in the same manner. Actually compartment 70f may be considered to be part of tab 15f inasmuch as it is adjacent thereto.

In FIGS. 29–32 another embodiment of an adsorbent unit 10e is shown which has a different configuration than the previous units. In this respect, adsorbent unit 10e includes a casing 130 formed of porous material, in this instance, heat-fusible felted polyester, but it may be fabricated of any other suitable material. Casing 130 is formed from two sides of felted polyester which are bonded to each other by fused seams, and it comprises a container 131 containing adsorbent 132 with the container having apertured tabs 133 and 134 at opposite end portions thereof. Adsorbent container 131 is defined by fused seams 135, 137, 139 and 140. Container 131 has a pronounced convex surface 141 and a less convex surface 142. Tab 133 includes an outer fused seam 143 which merges into the junction between seams 135 and 137 and between the junction of seams 135 and 140. Tab 133 includes an elongated aperture 136 which is outlined by fused seam 138. Tab 134 is defined by fused seams 139 and 144. First ends of seams 139 and 144 merge in-to seam 137 and second ends of seams 139 and 144 merge into seam 140. In tab 134 there is a fused seam 145 which has a slit 147 therein, and the slit 147 extends substantially throughout the entire length of the seam 145 and is outlined by fused seam portions 149 and 150 on opposite sides of slit 147. Slit 147 extends transversely to the central longitudinal axis 148 and its length approximates the widest portion of the container 131, as in the previous embodiments. A refrigerant tracer compartment 151 is formed on tab 134, and it includes opposite sides 152 and 153. A refrigerant tracer wafer 90 (FIG. 18) is housed within compartment 151.

Figures 4, 5:
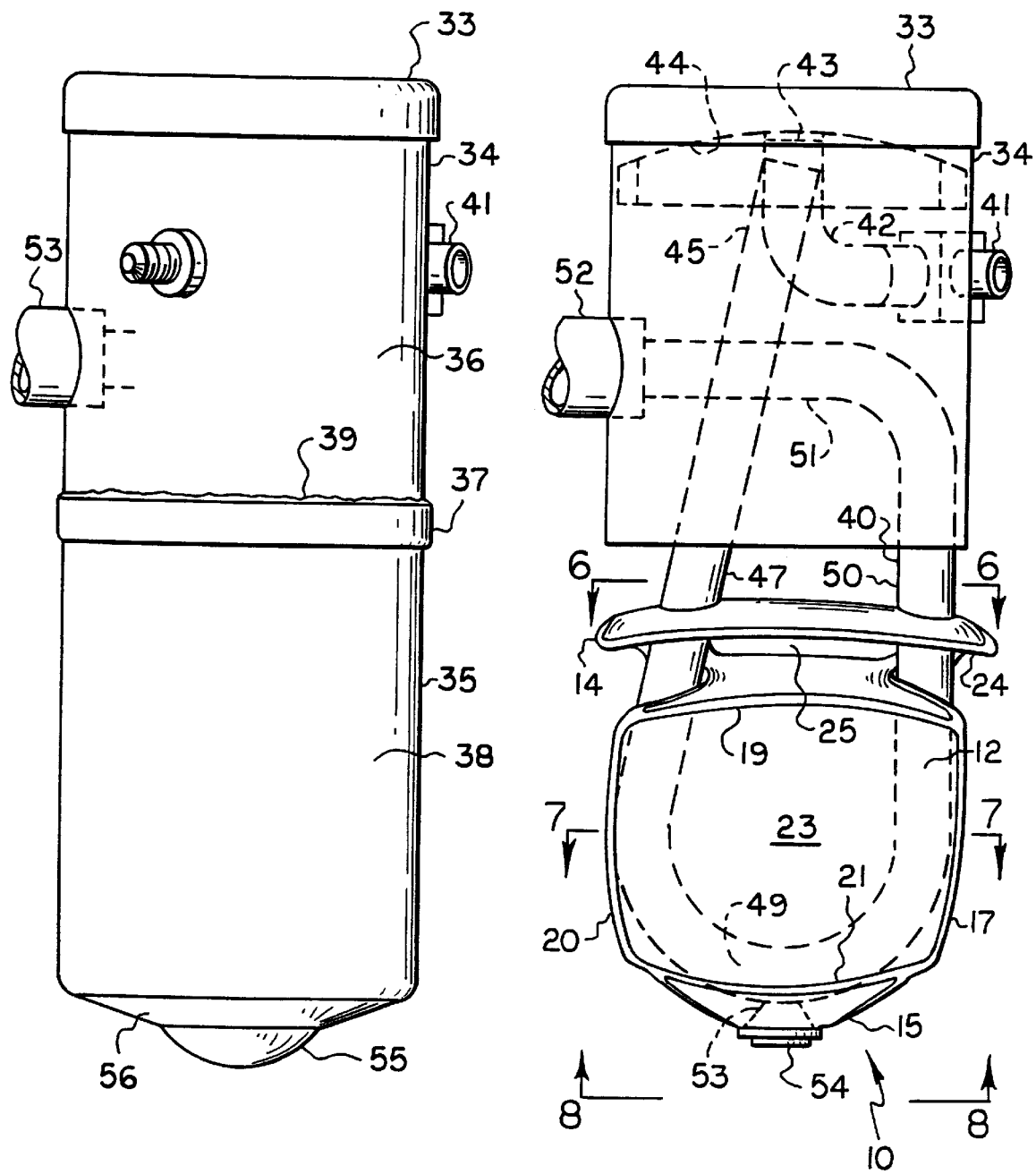
FIG. 4 is a side elevational view of a prior art accumulator type of receiver in which the adsorbent unit of FIGS. 1–3 is mounted.
FIG. 5 is a side elevational view of the accumulator of FIG. 4 with the bottom portion removed and the adsorbent unit of FIGS. 1–3 mounted relative to the U-bend pipe therein.
Figure 6:
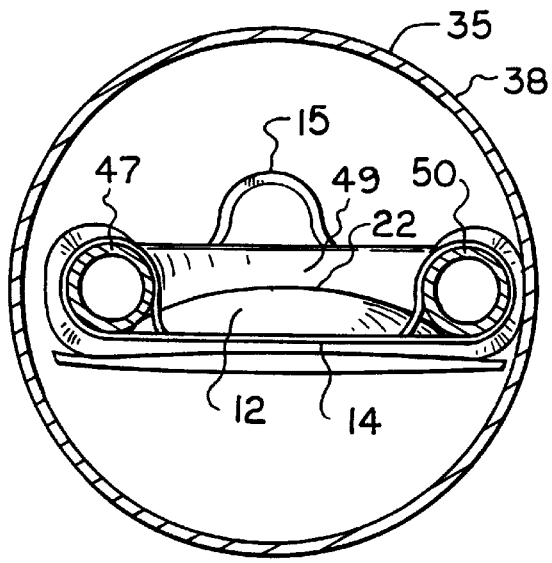
FIG. 6 is a cross sectional view taken substantially along line 6—6 of FIG. 5 and showing primarily the tab with the elongated slot of the embodiment of FIGS. 1–3 looped about the spaced pipes of the U-bend pipe.
Figure 7:
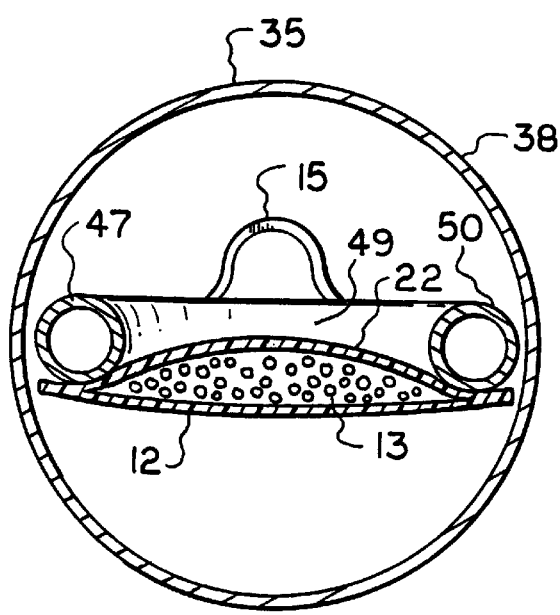
FIG. 7 is a cross sectional view taken substantially along line 7—7 of FIG. 5 and showing the relationship between the container of the adsorbent unit and the spaced pipes of the U-bend pipe.
Figure 8:
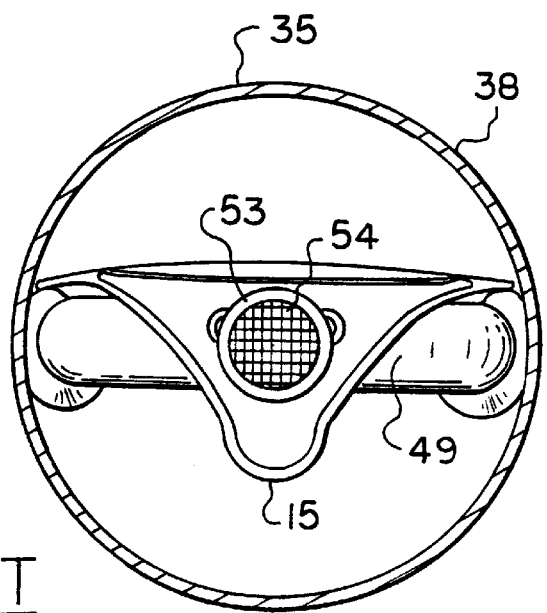
FIG. 8 is a view taken substantially in the direction of arrows 8—8 of FIG. 5 and showing the tab at the outer end of the adsorbent container mounted on the body of the filter housing on the return bend of the U-bend pipe.
Figures 9, 10:
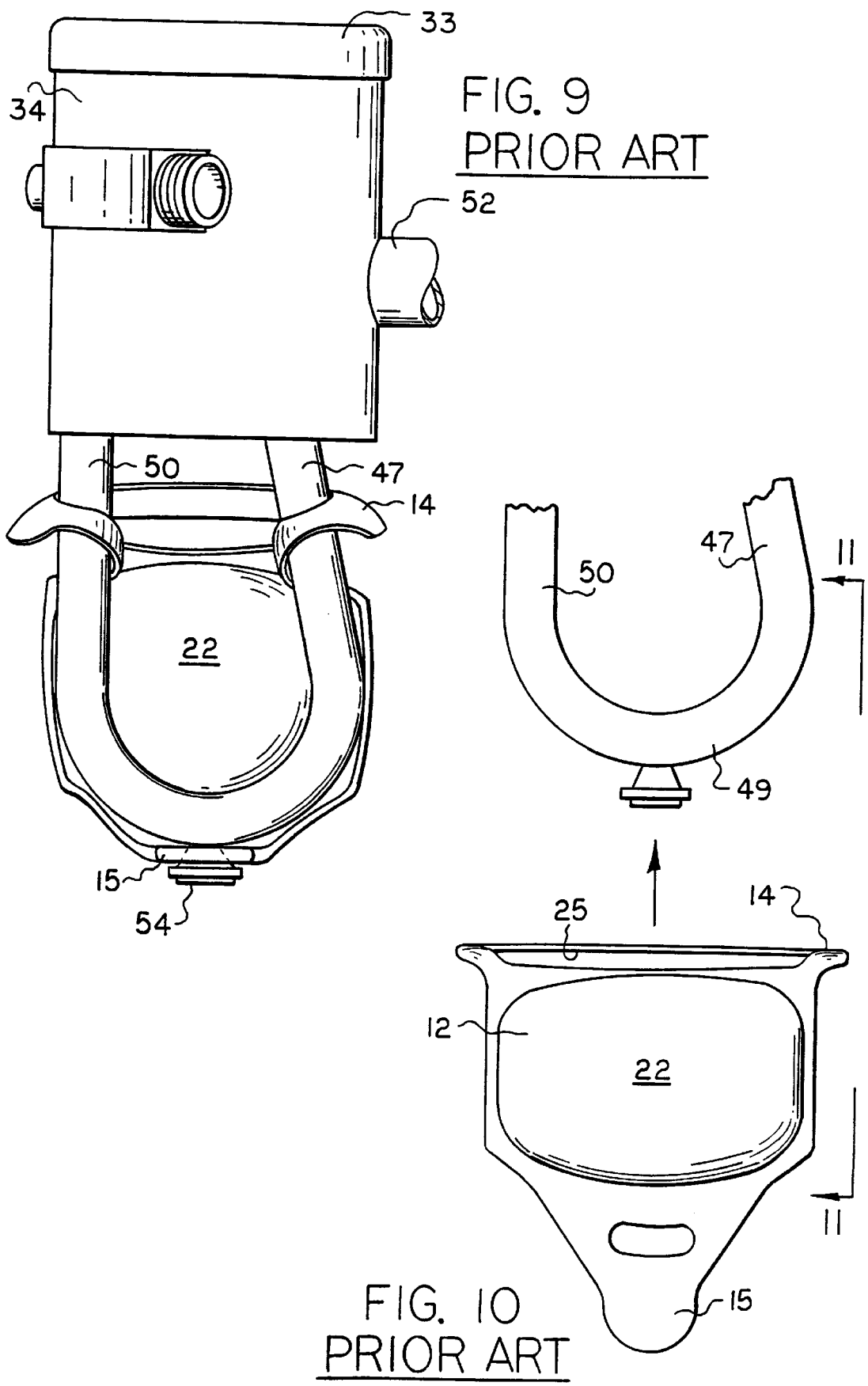
FIG. 9 is a view similar to FIG. 5 but showing the parts oriented 180° from the orientation in FIG. 5.
FIG. 10 is a schematic view showing the first step of mounting the tab with the elongated slot onto the end of the U-bend pipe.
Figure 11:
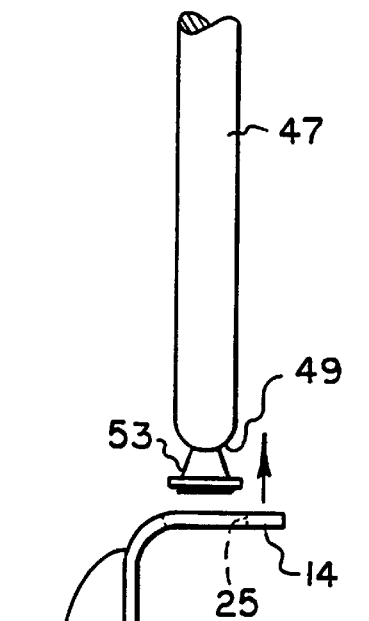
FIG. 11 is a view taken substantially in the direction of arrows 11—11 of FIG. 10.
Figure 12:
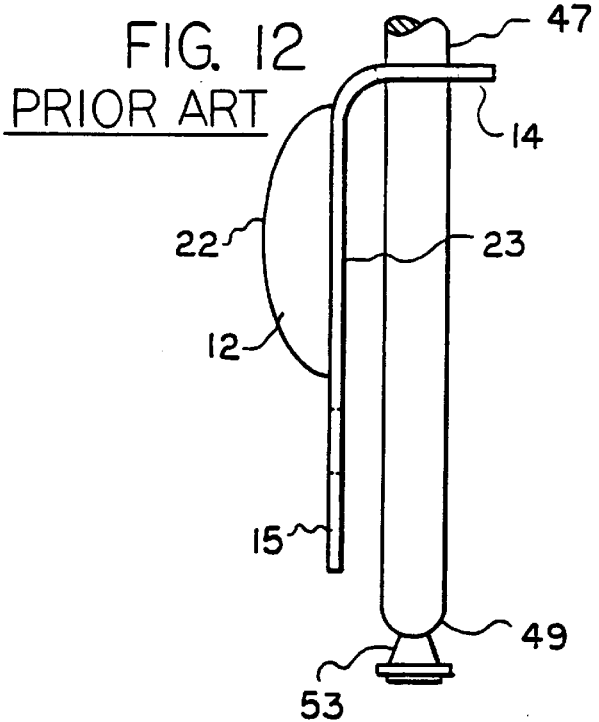
FIG. 12 is a schematic view showing the tab with the elongated slot looped about the spaced pipes of the U-bend pipe.
Figure 29:
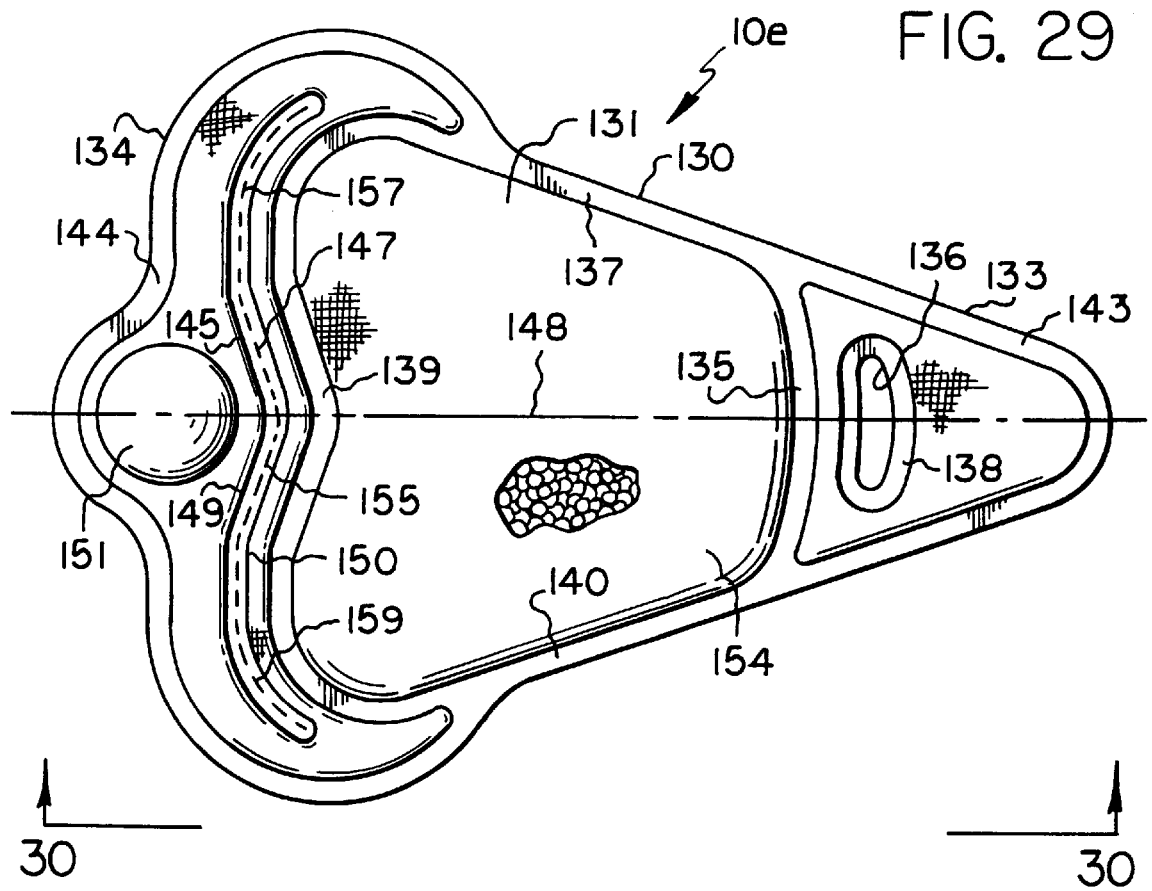
FIG. 29 is a plan view of another embodiment of an adsorbent unit of the present invention showing the tracer compartment on the tab of the adsorbent unit.
Figure 30:
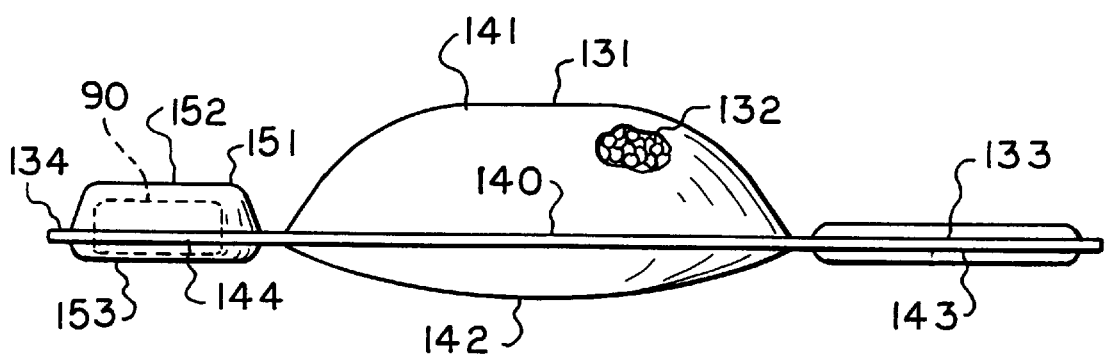
FIG. 30 is a fragmentary side elevational view taken substantially in the direction of arrows 30—30 of FIG. 29.
Figure 31:
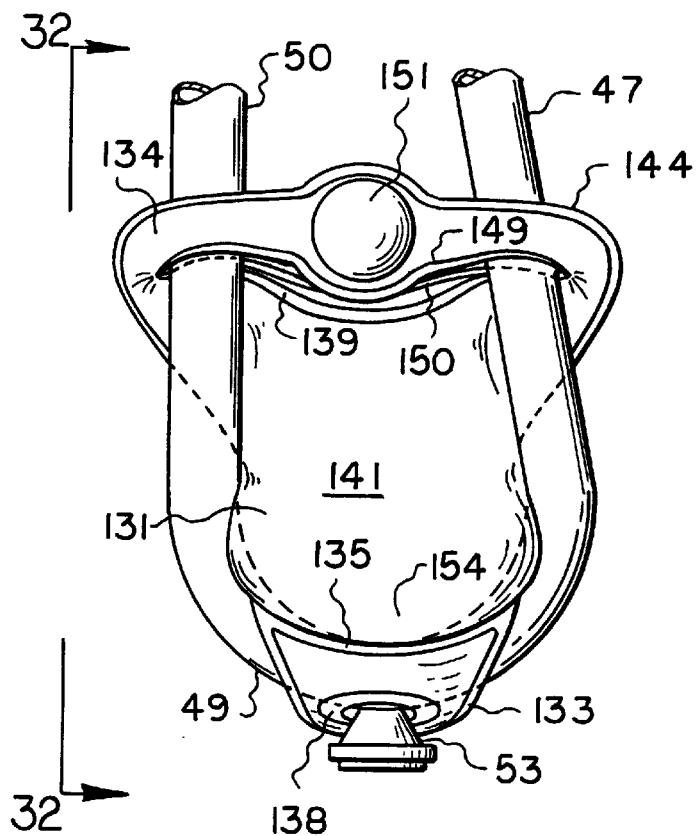
FIG. 31 is a fragmentary view similar to FIG. 5 and showing the adsorbent unit of FIG. 29 mounted relative to the spaced pipes of a U-bend.
Figure 32:
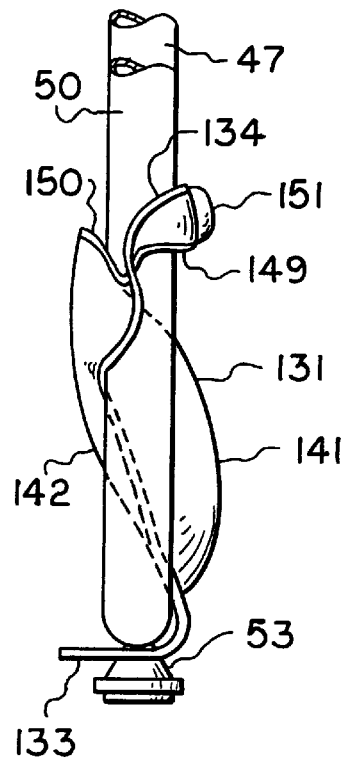
FIG. 32 is a fragmentary view taken substantially in the direction of arrows 32—32 of FIG. 31.

As can be seen from a comparison of FIGS. 29 and 30 with the preceding figures, the adsorbent container 131 is broadly of trapezoidal configuration in plan except that the opposite ends 135 and 139 are curved. The trapezoidal configuration enhances the installation of the adsorbent unit 10e relative to spaced pipes 47 and 50 of U-bend 40. In this respect, the adsorbent unit 10e is installed by passing the return bend 49 through the elongated slit 147 to the position shown in FIG. 31. The narrow end 154 of trapezoidal container 131 fits between the spaced pipes 47 and 50 and thus provides less bulging of the bag. Additionally, as can be seen from FIG. 32, since the bag is curved in passing between the legs, it causes the bag to occupy less height above return bend 49, that is, it is lower down on the U-bend so that its uppermost portion is more remote from the weld 39 (FIG. 4). The slitted opening 147 permits the entire adsorbent unit 10e to be shorter than comparable embodiments having a wide slot, such as 25 of FIG. 1, which, in turn, also permits the tab 134 to be further away from weld 39. Additionally, since a slit 147 is being utilized to receive the spaced pipes 47 and 50, this will cause the outer portion of tab 134 to lie closer to adsorbent container 131. It will be appreciated that the slit 147 has to be sufficiently long to receive the widest portion 49 of U-bend 40 so that tab 134 can be moved to the position of FIG. 31, and to this end, slit 147 is curved as shown at both its central portion 155 and its ends 157 and 159 so that the required length of slit is obtained to receive the return bend 49 during the mounting of tab 134 on spaced pipes 47 and 50. In its installed position, the aperture 136 in tab 133 receives the filter housing 53 as described above relative to FIGS. 5 and 8.

While the tracer compartment has been disclosed in FIGS. 15–32 as part of an adsorbent unit which has a loop at the opposite end thereof for attachment to a U-bend of an accumulator, it will be appreciated that other types of adsorbent units can have separate compartments thereon which maintain the refrigerant tracer separated from the adsorbent in the adsorbent container. In this respect, for example, the separate tracer compartment may be formed on an adsorbent container of a saddle-type adsorbent unit of the general type shown in U.S. Pat. No. 4,401,447, which is incorporated herein by reference, or it may be formed on the yoke thereof which fits under the return bend of an U-shaped pipe, or on the yoke which is located on the opposite sides of a single pipe. Also, it will be appreciated that a separate tracer compartment may be formed on any other type of adsorbent unit, either integrated with the adsorbent container in a manner such as shown in FIGS. 15–20, or as part of any tab associated therewith, or as a separate compartment attached to the adsorbent unit in any manner whatsoever.

While the separate refrigerant tracer compartment has been described with respect to an adsorbent unit used in a special type of accumulator, it will be appreciated that a separate tracer compartment can be applied to other types of adsorbent units which are to be used in refrigerant receivers.

While preferred embodiments of the present invention have been disclosed, it will be appreciated that the present invention is not limited thereto but may be otherwise embodied within the scope of the following claims.

What is claimed is:

1. An adsorbent unit comprising a porous adsorbent container having a width, adsorbent in said container, first and second end portions on said container, first and second tabs extending outwardly from said first and second end portions, respectively, of said container, a central axis extending through said container and said first and second tabs, an elongated slot in said first tab extending transversely to said central axis, said elongated slot having a length which approximates said width of said container, an aperture in said second tab, and a compartment on at least one of said first and second tabs containing a refrigerant tracer.

2. An adsorbent unit as set forth in claim 1 wherein said compartment is on said first tab.

3. An adsorbent unit as set forth in claim 1 wherein said compartment is on said second tab.

4. An adsorbent unit as set forth in claim 1 wherein said container and said first and second tabs are fabricated of fusible fabric, and first and second fused seams outlining said elongated slot and said compartment, respectively.

5. In a refrigerant accumulator having a housing with a bottom wall and a side wall and a U-shaped pipe with a return bend adjacent said bottom wall and with first and second pipe portions extending from said return bend along said side wall, and a filter body extending outwardly from said return bend, the improvement of an adsorbent unit comprising a porous adsorbent container, adsorbent in said container, first and second end portions on said container, a first tab extending outwardly from said first end portion of said container, an elongated slot in said first tab mounting said first tab on said first and second pipe portions, a second tab extending outwardly from said second end portion of said container, an aperture on said second tab mounting said second tab on said filter body, and a compartment on said first tab containing a refrigerant tracer.

6. In a refrigerant accumulator as set forth in claim 5 wherein said container includes a convex side which fits between said first and second pipe portions.

7. In a refrigerant accumulator as set forth in claim 5 wherein said container and said first and second tabs are fabricated of fusible fabric, and first and second fused seams outlining said elongated slot and said compartment, respectively.

8. In a refrigerant accumulator as set forth in claim 7 wherein said first and second tabs are substantially planar.

9. An adsorbent unit for mounting relative to a U-bend pipe of a refrigerant accumulator having spaced pipes and a return bend having a filter body on its underside comprising a porous container, adsorbent in said container, first and second end portions on said container, first mounting means on said first end portion for placement about said spaced pipes with said container located between said first mounting means and said return bend, second mounting means at said second end of said container for mounting on said filter body on said U-bend pipe, and a separate compartment on said adsorbent unit containing a refrigerant tracer.

10. An adsorbent unit as set forth in claim 9 wherein said porous container and said first and second mounting means are fabricated from fusible fabric.

11. An adsorbent unit for mounting relative to a U-bend pipe of a refrigerant accumulator having spaced pipes and a return bend comprising a porous container, adsorbent in said container, first and second end portions on said container, first mounting means on said first end portion for placement about said spaced pipes with said container located between said first mounting means and said return bend, second mounting means at said second end of said container for mounting relative to said return bend, and a separate compartment on said adsorbent unit containing a refrigerant tracer.

12. An adsorbent unit as set forth in claim 11 wherein said porous container and said first and second mounting means are fabricated from fusible fabric.

13. An adsorbent unit for an air conditioning system comprising a porous container, adsorbent in said container, a refrigerant tracer, and a separate compartment on said adsorbent unit containing said refrigerant tracer.

14. An adsorbent unit as set forth in claim 13 wherein said compartment is immediately adjacent to said container.

15. An adsorbent unit as set forth in claim 13 wherein said compartment is a part of said adsorbent unit which is separate from said container.

16. An adsorbent unit as set forth in claim 13 wherein said adsorbent unit includes a tab, and wherein said separate compartment is located on said tab.

17. An adsorbent unit as set forth in claim 13 wherein said adsorbent unit has a longitudinal centerline, a tab on said container, and a longitudinal slit in said tab extending transversely to said longitudinal centerline.

18. An adsorbent unit as set forth in claim 17 wherein said slit is curved.

19. An adsorbent unit as set forth in claim 17 wherein said container includes a wide portion proximate said tab and a narrow portion remote from said tab.

20. An adsorbent unit as set forth in claim 13 wherein said container includes a wide portion proximate said tab and a narrow portion remote from said tab.

21. An adsorbent unit comprising a porous adsorbent container having a width, adsorbent in said container, a tab extending outwardly from said container, an elongated slot in said tab extending in the direction of said width of said container and said tab having a length which approximates the widest portion of said container, and a compartment on said tab containing a refrigerant tracer.

* * * * *